United States Patent [19]

Smith

[11] 4,115,034

[45] Sep. 19, 1978

[54] VEHICLE-ACTUATED AIR COMPRESSOR AND SYSTEM THEREFOR

[76] Inventor: Roland L. Smith, 4600 U.S. Hwy. 19 North, Palm Harbor, Fla. 33563

[21] Appl. No.: 814,685

[22] Filed: Jul. 11, 1977

[51] Int. Cl.² .................. F04B 17/06; F04B 35/06
[52] U.S. Cl. .................... 417/231; 417/332; 417/334; 417/534; 417/903
[58] Field of Search ............ 417/229, 903, 534, 231, 417/233

[56] References Cited

U.S. PATENT DOCUMENTS

| | | | |
|---|---|---|---|
| 159,660 | 2/1875 | Faivre | 196/106 |
| 344,911 | 7/1886 | Kimball | 417/229 X |
| 464,361 | 12/1891 | Hodgson | 417/231 |
| 490,666 | 1/1893 | Layman | 417/231 |
| 506,241 | 10/1893 | Layman | 417/231 |
| 616,468 | 12/1898 | Jones | 417/330 |
| 639,706 | 12/1899 | Burger | 417/231 |
| 656,645 | 8/1900 | Hoff | 417/211 |
| 988,508 | 4/1911 | Reynolds | 290/4 R |
| 1,033,923 | 7/1912 | Nyswander | 417/319 |
| 1,351,176 | 8/1920 | Lillos | 417/903 X |
| 1,545,232 | 7/1925 | Buttrick | 246/271 |
| 1,600,352 | 9/1926 | Nagy | 417/229 X |
| 1,771,200 | 7/1930 | Akers | 417/229 |
| 2,020,361 | 11/1935 | Johnston | 417/214 |
| 2,333,614 | 11/1943 | Boyd | 417/229 |
| 3,603,804 | 9/1971 | Casey | 417/332 X |
| 4,004,422 | 1/1977 | LeVan | 60/533 |

Primary Examiner—Carlton R. Croyle
Assistant Examiner—Richard E. Gluck
Attorney, Agent, or Firm—Oltman and Flynn

[57] ABSTRACT

A vehicle-actuated air compressor and a system are disclosed for utilizing compressed air to operate an electrical generator to generate electricity. The vehicle-actuated air compressor includes an actuator, a cylinder, and a piston in the cylinder reciprocatable in response to actuation of the actuator by a vehicle for compressing air in the cylinder. The cylinder is provided with a first vent means for introducing air into the cylinder behind the piston during a forward stroke of the piston, a valve-controlled second vent means for introducing air into the cylinder on the other side of the piston during the reverse stroke thereof, and outlet means for supplying air compressed by the piston during the forward stroke thereof to a utilization device. In the system for generating electricity, the air compressor is combined with an electricity generator operated by compressed air to generate electricity, and at least one air storage unit coupled between the electricity generator and the outlet means of the cylinder for storing compressed air enroute to the generator. The air storage unit may be supplied with compressed air from other vehicle-actuated air compressors to provide a network for supplying compressed air to the air operated electricity generator. The vehicle may be land-borne or water-borne or both types may be used in one network.

8 Claims, 27 Drawing Figures

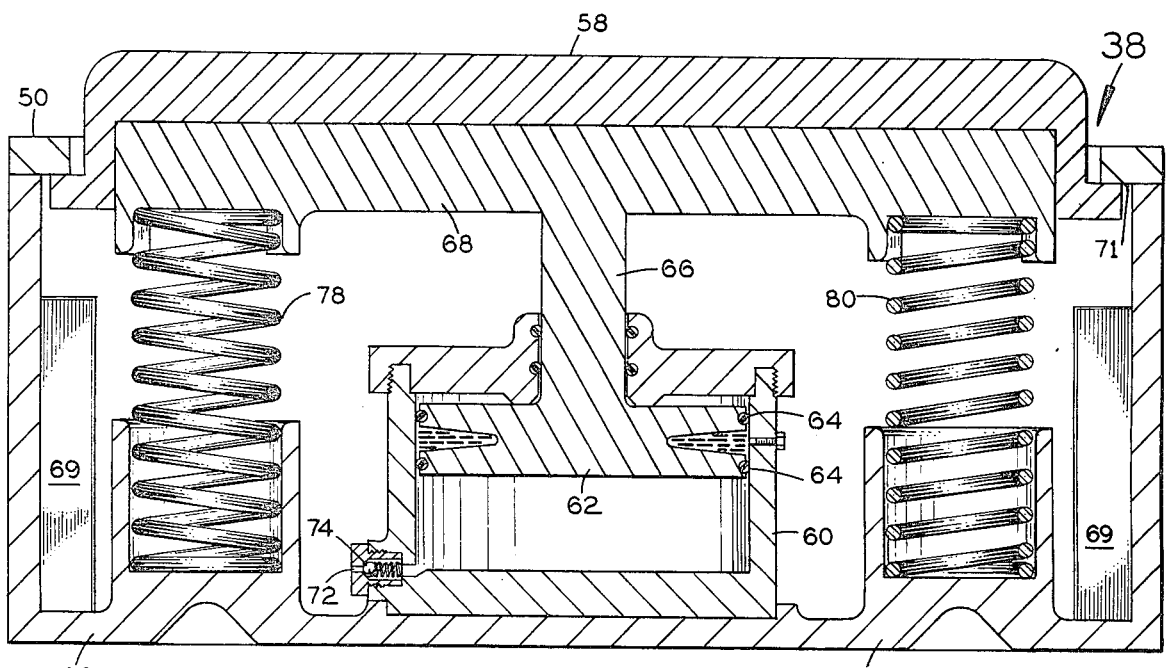
FIG. 3
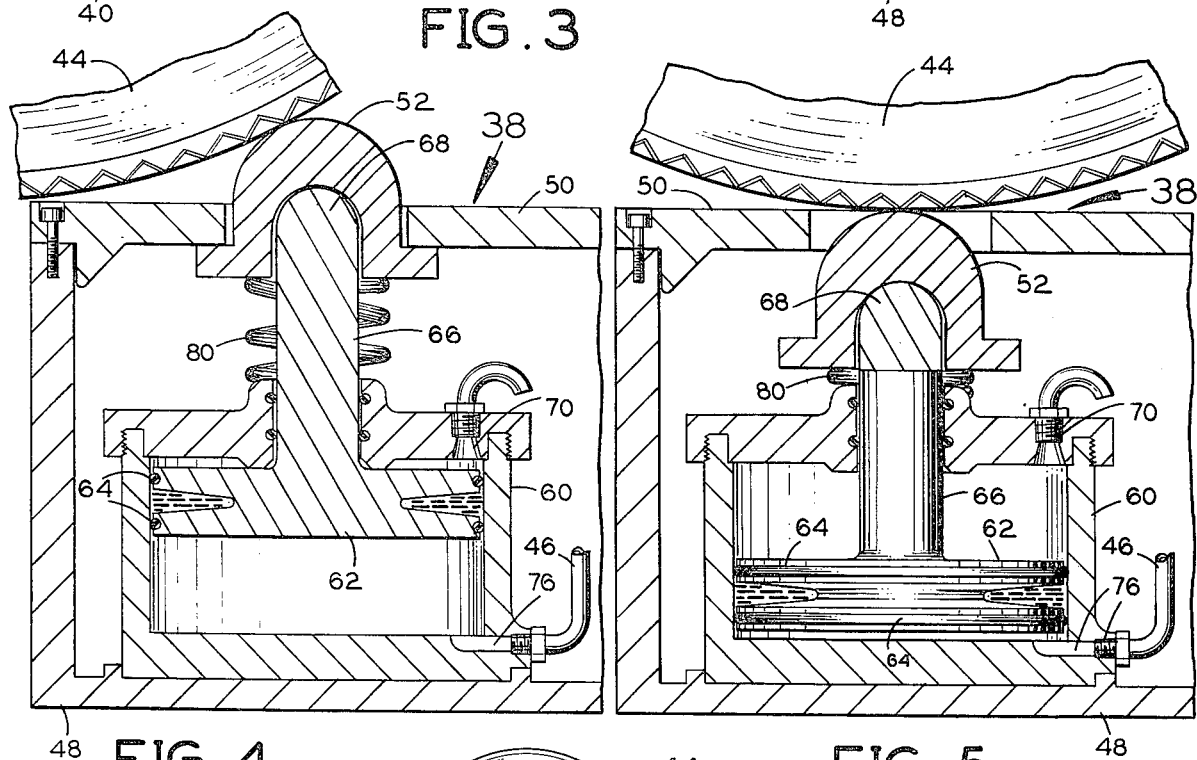
FIG. 4
FIG. 5
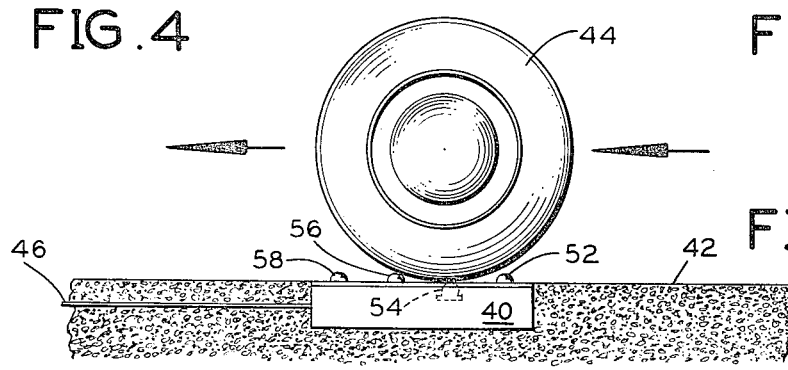
FIG. 6

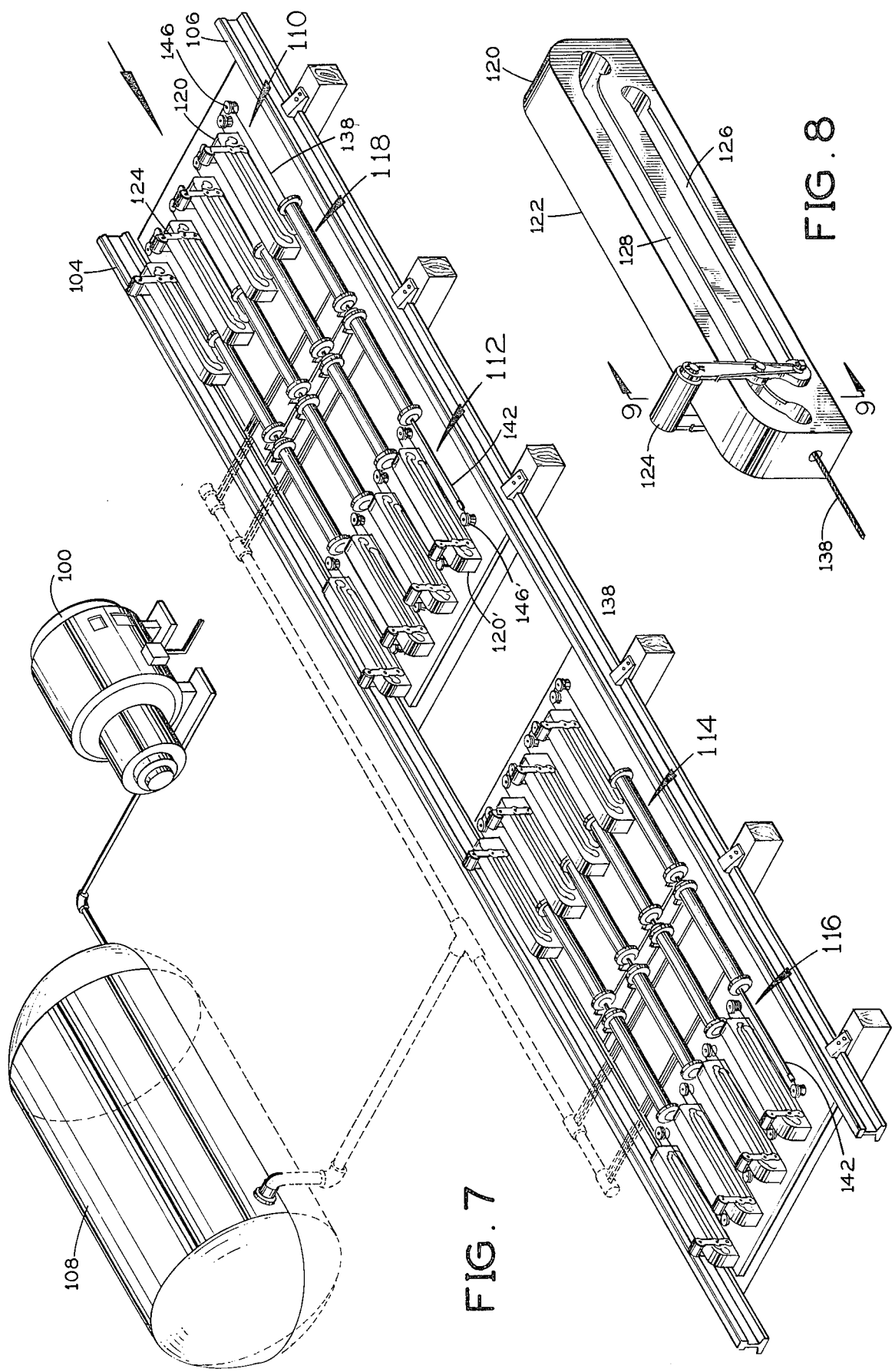

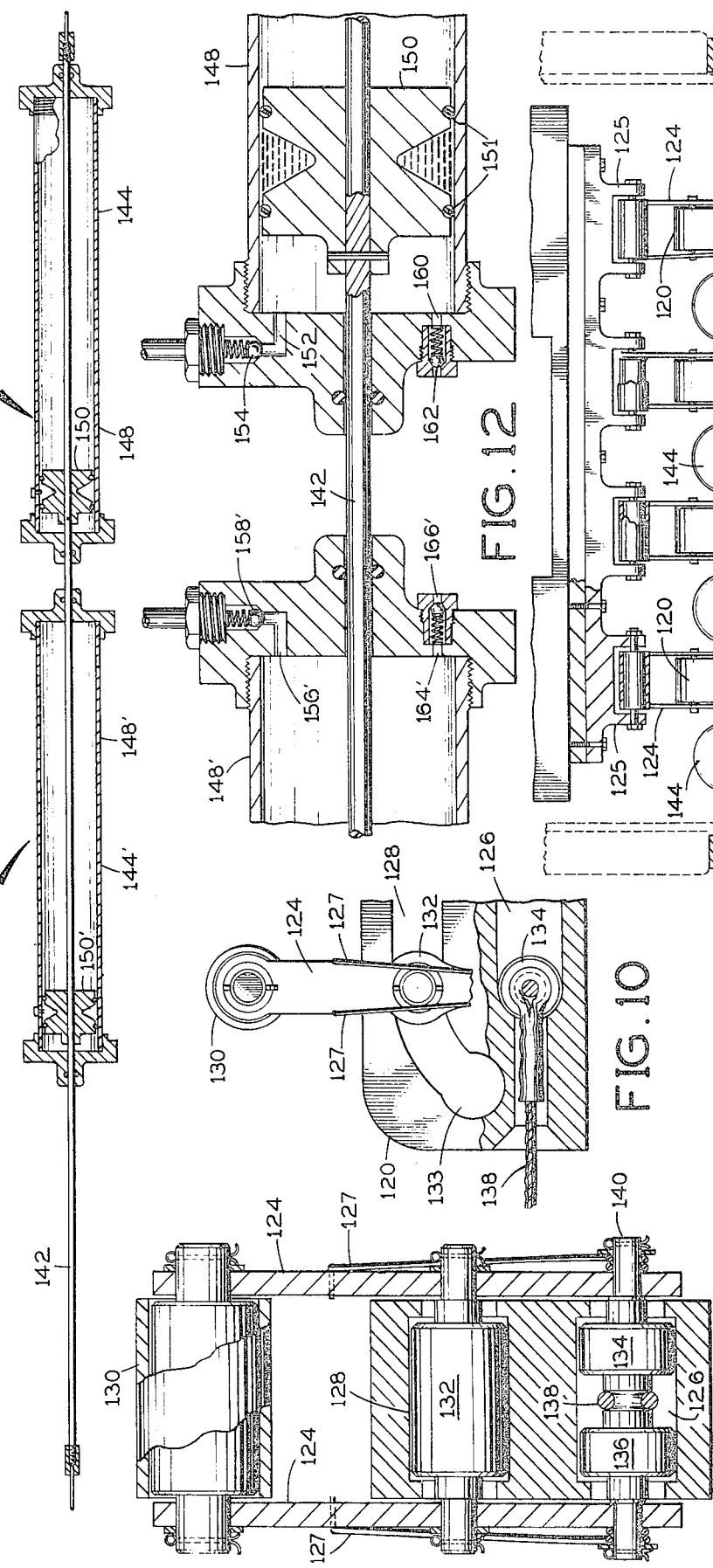

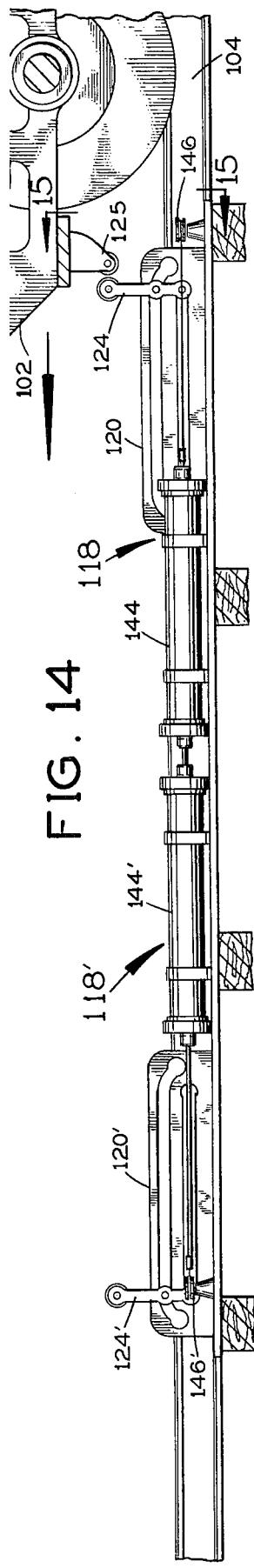
FIG. 14
FIG. 16
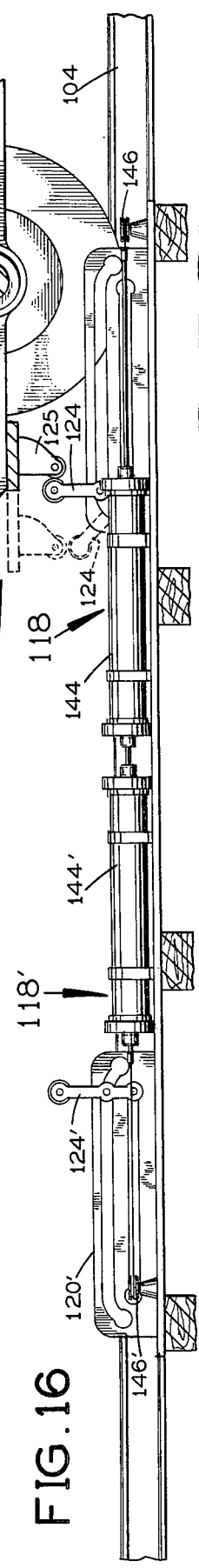
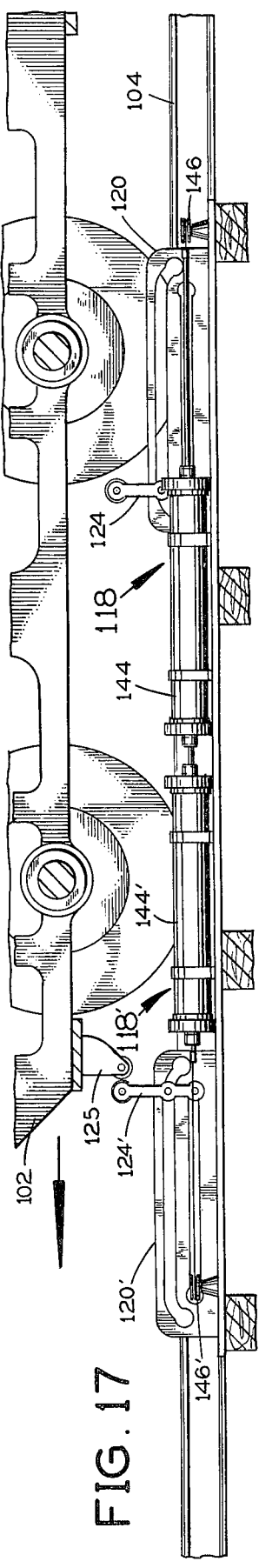
FIG. 17
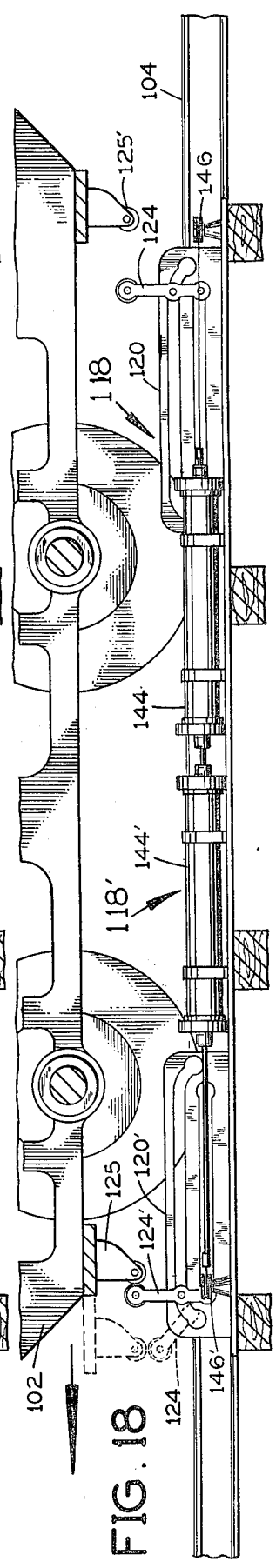
FIG. 18

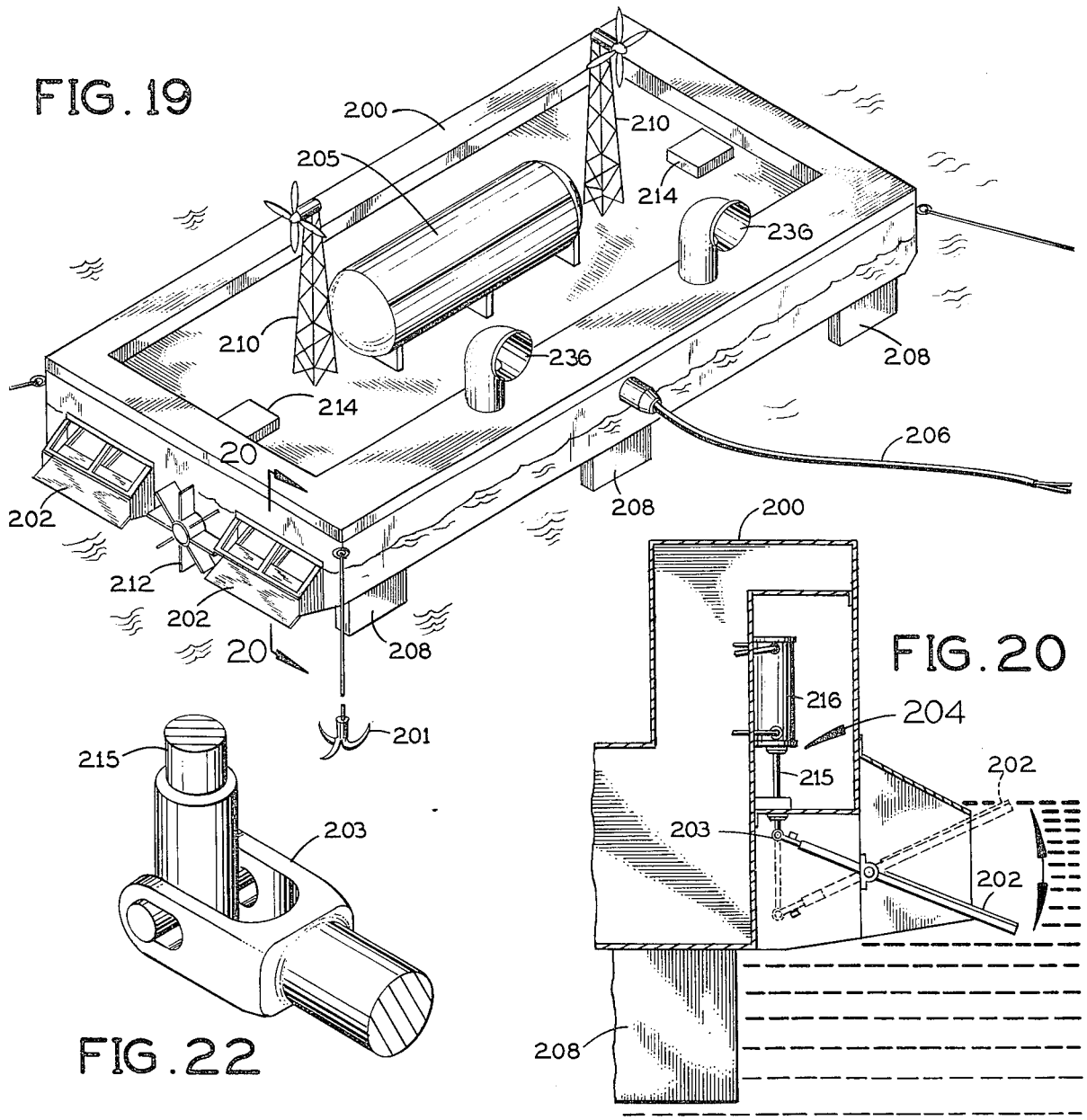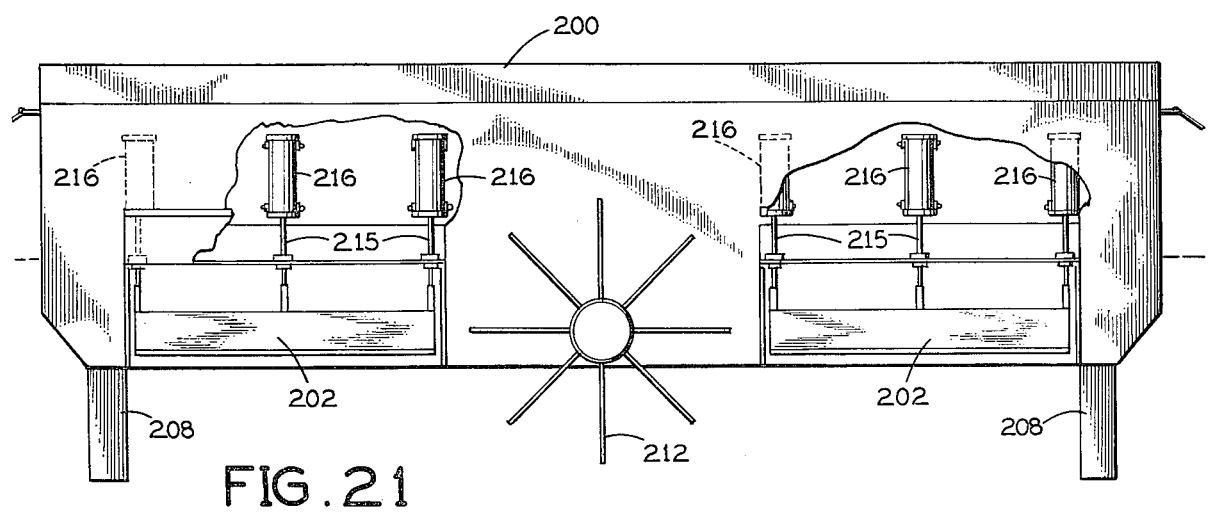

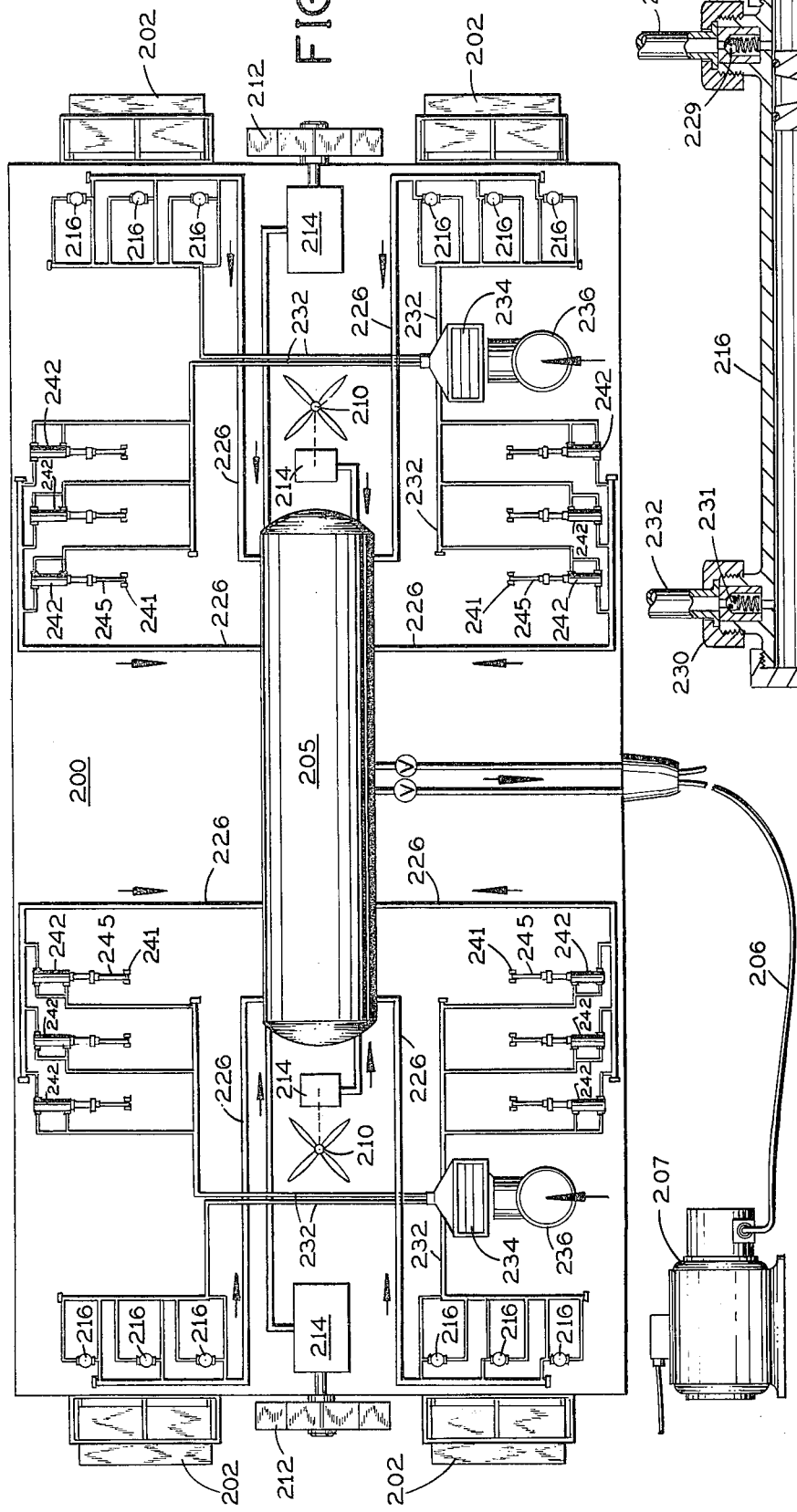
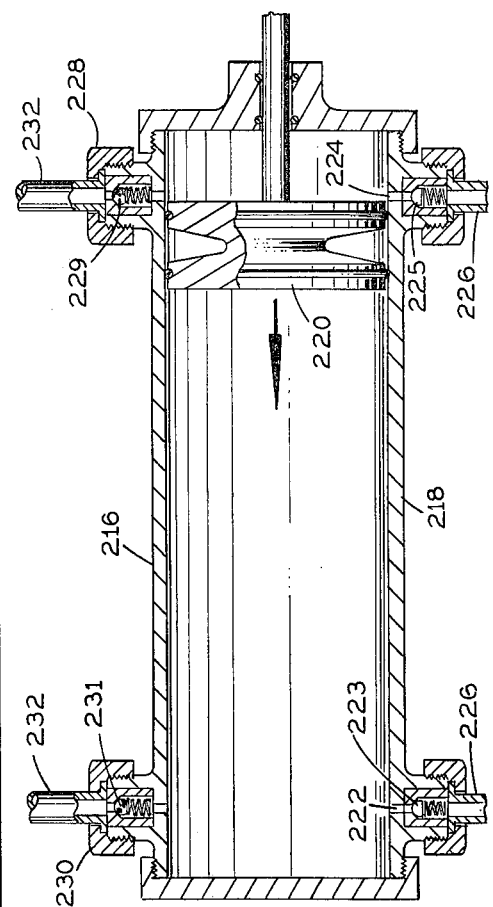
FIG. 27
FIG. 26

VEHICLE-ACTUATED AIR COMPRESSOR AND SYSTEM THEREFOR

BACKGROUND OF THE INVENTION

At the present time, it appears that shortages of conventional forms of energy, particularly oil, have become critical. Much effort has been devoted to finding alternate sources of energy. Most energy sources suffer from drawbacks. Some are limited as to the amounts available, and when a particular material has been used it is gone forever. They are not available to all nations. Some have created ecological problems. It is not known how to handle some energy sources safely or dispose of their wastes safely. Most, with the exception of gravity, wind and water, are not forces by themselves. They can do nothing unless something is done to them.

SUMMARY OF THE INVENTION

The present invention is an attempt to harness gravity. Use is made of air and water as required.

To this end, the invention provides a system for compressing air by gravity-related forces and utilizing the compressed air to generate electrical energy. The system includes an electricity generator operated by compressed air, and an air storage means operatively connected to the generator to supply compressed air to the generator for operating the same. An actuator is provided for actuation in response to motion of a vehicle. By way of example, this motion may be motion of waves in a body of water or it may be motion of a vehicle on land, if desired. A piston in a cylinder is movable in forward and reverse strokes in response to actuation of the actuator by a vehicle for compressing air in the cylinder. The cylinder is provided with a first vent means for introducing air into the cylinder behind the piston during a forward stroke thereof. A second valve-controlled vent means is provided for the cylinder for introducing air into the cylinder on the other side of the piston during the reverse stroke thereof. Outlet means for the cylinder supplies air compressed by the piston to the air storage means enroute to the electrical generator. Thus, gravity forces acting on the vehicle are harnessed to compress air and the compressed air is utilized to generate electricity.

Accordingly, it is an object of the present invention to harness gravity forces for the generation of electricity utilizing compressed air as an intermediary.

Another object of the invention is to enable gravity forces acting on a vehicle, such as a land-borne vehicle or a water-borne vehicle, to operate a piston and cylinder device for compressing air which is ultimately supplied to an electrical generator operated by compressed air to generate electricity.

Another object of the invention is to provide a vehicle-actuated air compressor in which a piston in a cylinder is reciprocated by the operation of an actuator in response to motion of a vehicle to compress air in the cylinder which can be supplied to a utilization device.

Other objects of this invention will appear from the following description and appended claims, reference being had to the accompanying drawings forming a part of this specification wherein like reference characters designate corresponding parts in the several views.

BRIEF DESCRIPTION OF THE DRAWINGS

FIG. 3 is a sectional view taken along the lines 3—3 of FIG. 2;

FIG. 4 is a sectional view taken along lines 4—4 of FIG. 2 and showing an actuator of an air compressor as it is about to be depressed by a wheel of a vehicle;

FIG. 5 is a sectional view similar to FIG. 4 showing an actuator of an air compressor after it has been depressed by the wheel of a vehicle;

FIG. 6 is a cut-away view of a roadway showing a unit with multiple air compressors having actuators being depressed sequentially by a wheel of a moving vehicle.

FIG. 7 is a perspective view showing a system for generating electricity by the use of compressed air in accordance with another embodiment of the invention;

FIG. 8 is a perspective view of an actuator included in the system of FIG. 7;

FIG. 9 is a sectional view taken along line 9—9 of FIG. 8;

FIG. 10 is a fragmentary view, partly in section, of one end of the actuator;

FIG. 11 is a sectional view showing piston and cylinder devices of two different air compressors connected back-to-back;

FIG. 12 is a fragmentary sectional view showing two adjoining ends of the piston and cylinder devices of FIG. 11 on an enlarged scale;

FIG. 13 is a plan view of two piston and cylinder devices arranged as in FIG. 11 together with actuators for the same;

FIG. 14 is an elevational view of the piston and cylinder devices of FIG. 13 with the actuator of one device about to be actuated by a moving train;

FIG. 15 is a vertical sectional view taken along line 15—15 of FIG. 14;

FIG. 16 is a view similar to FIG. 14 illustrating by dashed lines the changed position of an actuator lever for the right-hand air compressor;

FIG. 17 is another in a series of views similar to FIG. 14 showing the actuator lever of the left-hand air compressor as it is about to be actuated by the moving train;

FIG. 18 is still another in the series of views similar to FIG. 14 showing by dashed lines the position of the actuator lever after it has been actuated;

FIG. 19 is a perspective view of a system for generating electricity by the use of compressed air utilizing motion of a water-borne vehicle due to surf or turbulent water to operate air compressors;

FIG. 20 is a vertical sectional view taken along line 20—20 of FIG. 19;

FIG. 21 is an end-elevational view, partly borken away, of the water-borne vehicle showing several air compressors;

FIG. 22 is a perspective view of a coupling for the water-borne vehicle;

FIG. 26 is a sectional view of a piston and cylinder device included in the system of FIG. 19; and FIG. 27 is a schematic diagram of the system of FIG. 19.

Figure 1:
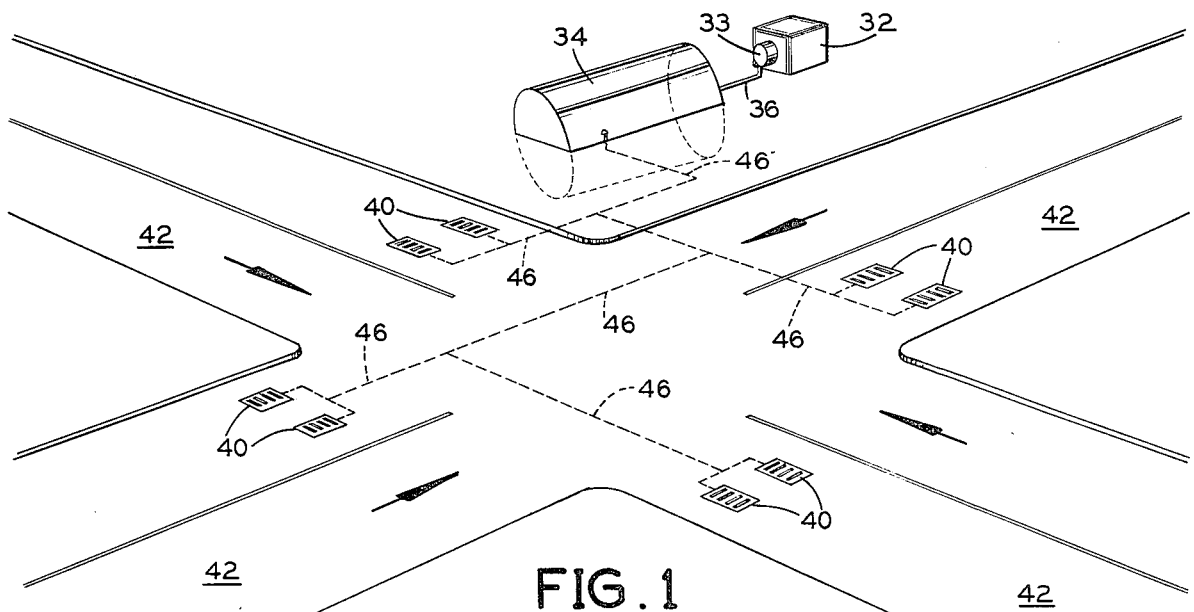
FIG. 1 is a schematic diagram of a system for generating electrical energy by the use of compressed air in accordance with one embodiment of the invention.
Figure 2:
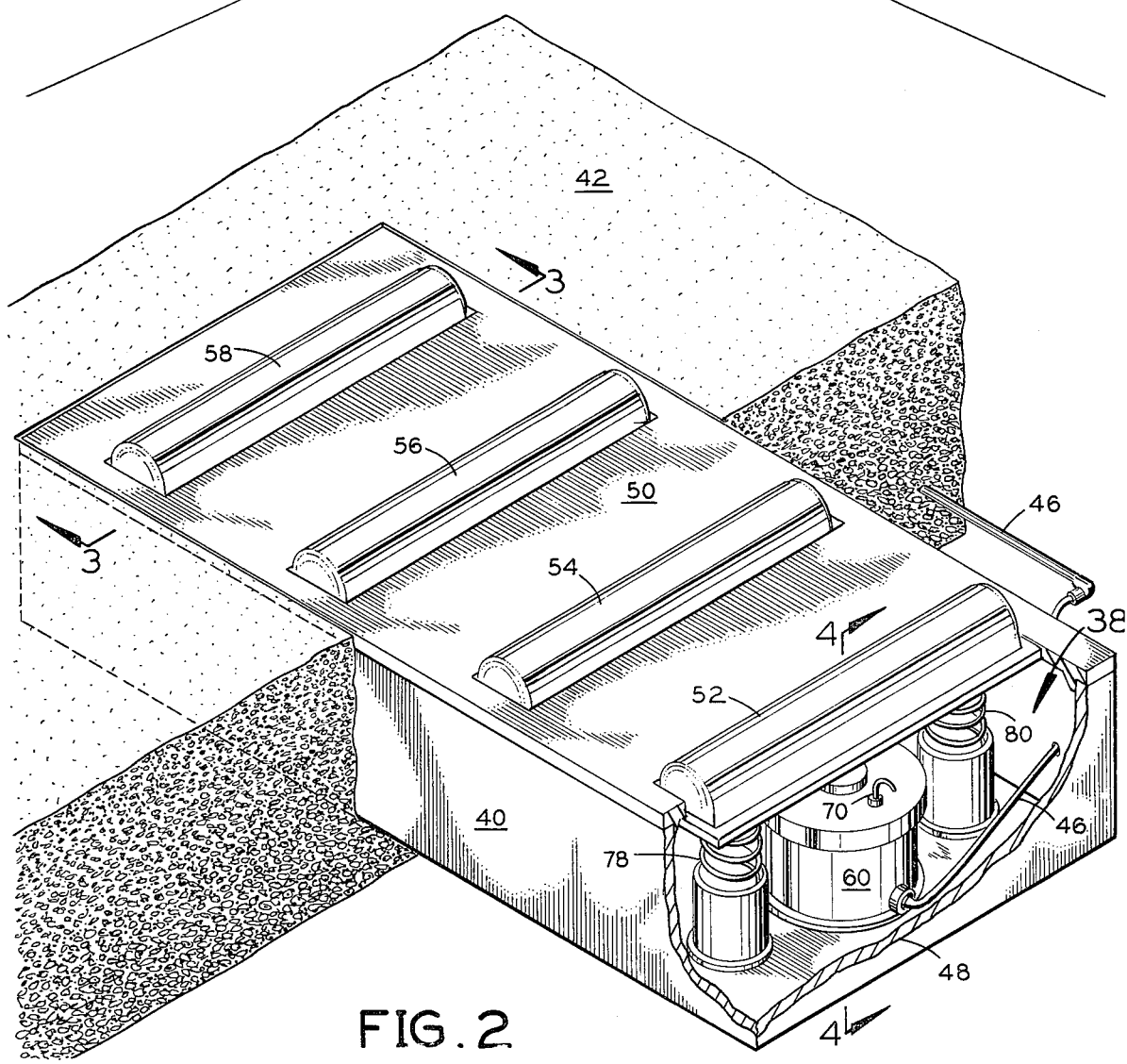
FIG. 2 is a perspective view of a vehicle-actuated air compressor included in the system of FIG. 1.

Before explaining the disclosed embodiments of the present invention in detail, it is to be understood that the invention is not limited in its application to the details of the particular arrangements shown, since the invention is capable of other embodiments. Also the terminology used herein is for the purpose of description and not of limitation.

DETAILED DESCRIPTION

Referring first to FIGS. 1 through 5, there is shown a vehicle-actuated system 30 for compressing air and thereby generating electrical energy. The system includes an electricity generator 32 which is turned by a compressed air motor 33 to generate electricity. Compressed air motors suitable for driving a generator are available commercially.

An air storage tank 34 is connected by a line 36 to the generator 32 for supplying compressed air to the generator for supplying compressed air to the generator for operating it. There may be more than one tank in the system if desired.

The compressed air is supplied by vehicle-actuated air compressors 38 which are contained in compressor units 40 that are embedded in roadways 42. In the system shown in FIG. 1, two compressor units 40 are mounted in the left hand lane of each roadway 42 near an intersection so that when a car or truck crosses the intersections, its wheels will pass over the units 40. FIG. 6 shows a wheel 44 of an automotive vehicle passing over one of the compressor units 40 which, as shown, is recessed in the roadway 42. The compressor units 40 are connected by air lines 46 to the storage tank 34 for supplying the compressed air to the storage tank.

Each compressor unit 40 includes a box-line housing 48 having a top 50 from which four movable actuators 52, 54, 56 and 58 project. When the wheel 44 passes over the unit 40, the actuators 52, 54, 56 and 58 are depressed sequentially.

The actuator 52 is part of a vehicle actuated compressor 38 which is shown more fully in FIGS. 3, 4 and 5. Within the box 48, there is a cylinder 60, and a piston 62 inside the cylinder. The piston 62 is reciprocatable inside the cylinder 60, and it is appropriately sealed relative to the walls of the cylinder as with o-rings 64. The piston 62 has a plunger 66 which is connected loosely to the actuator 52 as with a nested, floating rod 68. Thus, the piston is movable in forward and reverse strokes in the cylinder in response to actuation of the actuator 52 by a vehicle for compressing air in the cylinder. Stops 69 and 71 limit the movement of the actuator 52 and rod 68.

There is a first vent 70 (FIGS. 4 and 5) communicating with the upper side of the piston for introducing air into the cylinder behind the piston during a forward stroke of the piston. There is also a second valve-controlled vent 72 for the cylinder communicating with the lower side of the piston for introducing air into the cylinder on the other side of the piston during a reverse stroke thereof. The vent 72 may be controlled by a spring-biased ball-check valve 74.

A valve-controlled outlet 76 communicates with the lower side of the piston and is connected with the line 46 for supplying air compressed by the piston during the forward stroke thereof to the air storage tank 34.

In operation, when the wheel 44 passes over the actuator 52 in the manner illustrated in the FIGS. 4 and 5, both the actuator 52 and the piston 62 are sharply depressed to compress air at the lower side of the piston, and this air is supplied through the line 46 to the air storage tank. After the wheel 44 passes over the actuator 52, both the actuator and the piston 62 are returned to the upper rest position by springs 78 and 80 which extend between the lower wall of the housing 48 and the actuator 52.

The outlet 76 may include a ball-check valve (not shown) similar to the ball-check valve 74 but reversed relative thereto for allowing compressed air to escape from the cylinder 60, but not allowing the compressed air to return into the cylinder during the reverse stroke of the piston 62.

FIGS. 7 through 18 illustrate another embodiment of the invention in which compressed air for operating an air-driven electrical generator 100 is derived from the motion of a train 102 rolling on tracks 104 and 106. The air-driven electrical generator 100 is in accordance with the previous description. Also, the air storage tank 108 is in accordance with the previous description.

Mounted between the tracks 104 and 106 are four banks 110, 112, 114 and 116, each containing four vehicle-actuated air compressors 118. Each air compressor includes an actuator unit 120 which has a body 122 and an actuator lever 124 which is reciprocatable back and forth along the length of the body 122 in slots or openings 126 and 128. The air compressor should be mounted at a place where the train is coasting such as on a downgrade or at the entrance to a station.

As shown particularly in FIGS. 9 and 10, the actuator lever 124 carries a rotatable roller 130 at its upper end. The lever 124 also carries a roller 132 which rides in the slot 128, and rollers 134 and 136 which ride in the slot 126. A cable 138 is affixed at the center of a shaft 140 between rollers 136 and 134, and the cable extends through the body 120 to the outside thereof.

FIG. 13 shows two air compressors 118 and 118' mounted back-to-back for delivering compressed air on both forward and reverse strokes of the actuators thereof. The actuator 120 is shown at the right side of FIG. 13, and the actuator 120' is shown at the left side of that Figure. The actuators are connected by the cables 138 and 138' to a rod 142 which extends through two piston and cylinder devices 144 and 144' associated respectively with the actuators 120 and 120'. The cables 138 and 138' pass around pulleys 146 and 146'.

The internal construction of the piston and cylinder devices 144 and 144' is shown in FIGS. 11 and 12. The devices 144 and 144' include cylinders 148 and 148', and pistons 150 and 150' in the cylinders. The pistons are reciprocatable within the cylinders and are suitably sealed by rings 151 relative to the cylinders so that they can compress air on both the forward and reverse strokes thereof. The cylinder 148 has an outlet 152 at the left end thereof as viewed in FIG. 12, and the outlet is controlled by the ball-check valve 154. The cylinder 148' has an outlet 156' at the right end thereof and the outlet 156' is controlled by a ball-check valve 158'. The right end of cylinder 148 has an outlet 156 and check valve 158 exactly the same as 156' and check valve 158'. Similarly, the left end of cylinder 148' has an outlet 152' and a check valve 154' exactly like outlet 152 and check valve 154. The left end of cylinder 148 has a vent 160 controlled by a ball-check valve 162 for introducing air into the cylinder as the piston 150 moves to the right.

The right end of cylinder 148' has an outlet 164' controlled by a ball-check valve 166' for introducing air into the cylinder 148' when the piston 150' is moving to the left. It will be understood that the cylinder 148 has a vent 164 and a ball-check valve 166 at the right hand thereof, and the cylinder 148' has a vent 160' and a check valve 162' at the left end thereof (not shown). Thus, both cylinders are adapted to compress air on both the forward and reverse strokes thereof and to allow air to enter the cylinder on the suction side of the piston.

Referring again to FIGS. 9 and 10, it may be seen that when the rollers 134 and 136 reach the end of the slot 126, the roller 132 is adapted to ride further in the slot 128 to the recess 133. This allows the actuator lever 124 to pivot at the end of each stroke thereof so that the roller 130 moves down. The lever 124 is returned to the upright position by torsion springs 127, which engage the lever 124 and the shaft 140 as shown in FIG. 9.

The operation of the vehicle-actuated air compressor units 118 and 118' is illustrated in FIGS. 14 through 18. In FIG. 14, the lever 124 is at the right end of the actuator unit 120 and the lever 124' is at the left end of the actuator unit 120'. The train 102 has a bumper 125 for engaging the levers 124 and 124'. As the train approaches from the right, it first engages the lever 124 and moves it to the left as shown in FIG. 16. During this motion, the lever 124' moves to the right. The bumper 125 causes the lever 124 to be depressed to the position shown in the dashed lines in FIG. 16 so that the bumper 125 can clear the lever 124. Next, the bumper 125 engages the lever 124' and pushes it to the left as shown in FIGS. 17 and 18. The motion of lever 124' to the left causes lever 124 to move to the right. The bumper 125 passes over the lever 124' which is depressed as shown in dashed lines. Another bumper 125' is then approaching the lever 124 so that the operation is repeated. Thus, each bumper on the train produces a forward stroke and a reverse stroke of the piston in each cylinder, and air is compressed in the cylinder on each stroke thereof. The air is supplied to the tank 108 for ultimately operating the air-driven electrical generator 100.

It may be noted that the embodiment of FIGS. 1-5 could be actuated by a train wheel.

FIGS. 19 through 27 illustrate another embodiment of the invention in which compressed air is derived from the motion of a water-borne vehicle 200 such as a barge. The motion of the barge 200 due to wave action causes paddles such as paddle 202 to reciprocate, thus compressing air in air compressors 204. The compressed air is stored in a tank 205 which may be located on the barge 200, and the air is ultimately supplied through a line 206 to an air-driven electrical generator 207 (FIG. 27) located on the barge or on shore. The air-driven electrical generator may be in accordance with the previous description.

The barge 200 is anchored by anchors 201 and may have vertical stand-off legs 208 to prevent the equipment mounted below it from fouling on the bottom of the body of water. The barge may carry windmills 210 and rotary paddles 212 which also operate suitable air compressors 214 that are connected to the air storage tank 205. Thus, the windmills and rotary paddles serve as other sources for supplying compressed air to the tank 205 and ultimately to the electrical generator.

As shown in FIG. 20, the air compressor units 204 are mounted at the side of the barge, and the vertically reciprocatable paddles 202 serve as actuators for the air compressor units. The air compressor units also include piston and cylinder devices 216 of the type shown in FIG. 26. Each device 216 includes a cylinder 218, and a piston 220 reciprocatable in the cylinder. The piston 220 is suitably sealed relative to the cylinder. At the left end of the cylinder 218, there is a valve controlled outlet 222, and at the right end of the cylinder 218 there is a valve controlled outlet 224. The outlet 222 includes a ball-check valve 223, and the outlet 224 includes a ball-check valve 225. The outlets 222 and 224 are connected by suitable lines 226 to the air storage tank 205. As the piston 220 reciprocates, it compresses air during both the forward and reverse strokes thereof, and the compressed air is supplied through outlets 222 and 224 to the tank 205.

The cylinder 218 has a vent 228 at the right end thereof, and another vent 230 at the left end thereof. Vent 228 includes a ball-check valve 229, and vent 230 includes a ball-check valve 231. The vents serve to introduce air into the cylinder behind the piston on the suction stroke thereof. In this embodiment, air is supplied to the vents through lines 232 which lead from an air filter unit 234 that is open to the atmosphere at inlets 236.

On the lower side of the barge 200, there are horizontally reciprocatable paddles 240. These paddles 240 serve as actuators for piston and cylinder devices 242 to form vehicle actuated air compressors 243. The piston and cylinder devices 242 may be identical to that shown in FIG. 26. They may have outlet lines 226 leading to the storage tank 205 in accordance with the previous description, and inlet lines 232 leading from the air filter units 234 also in accordance with the previous description.

FIG. 22 shows a coupling 203 for coupling one of the paddles 202 to the piston rod 215 of the piston and cylinder device 216.

Figure 23:
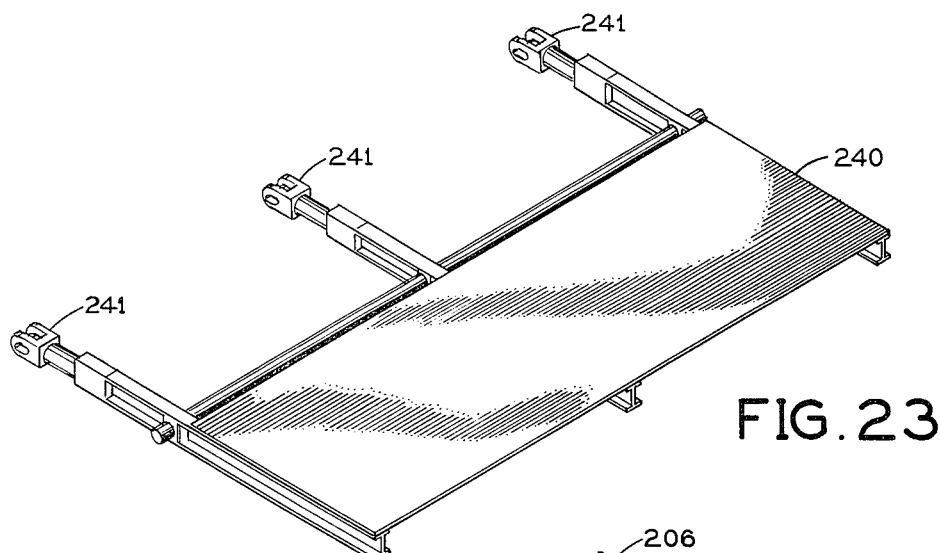
FIG. 23 is a perspective view of a paddle for the water-borne vehicle.
Figure 24:
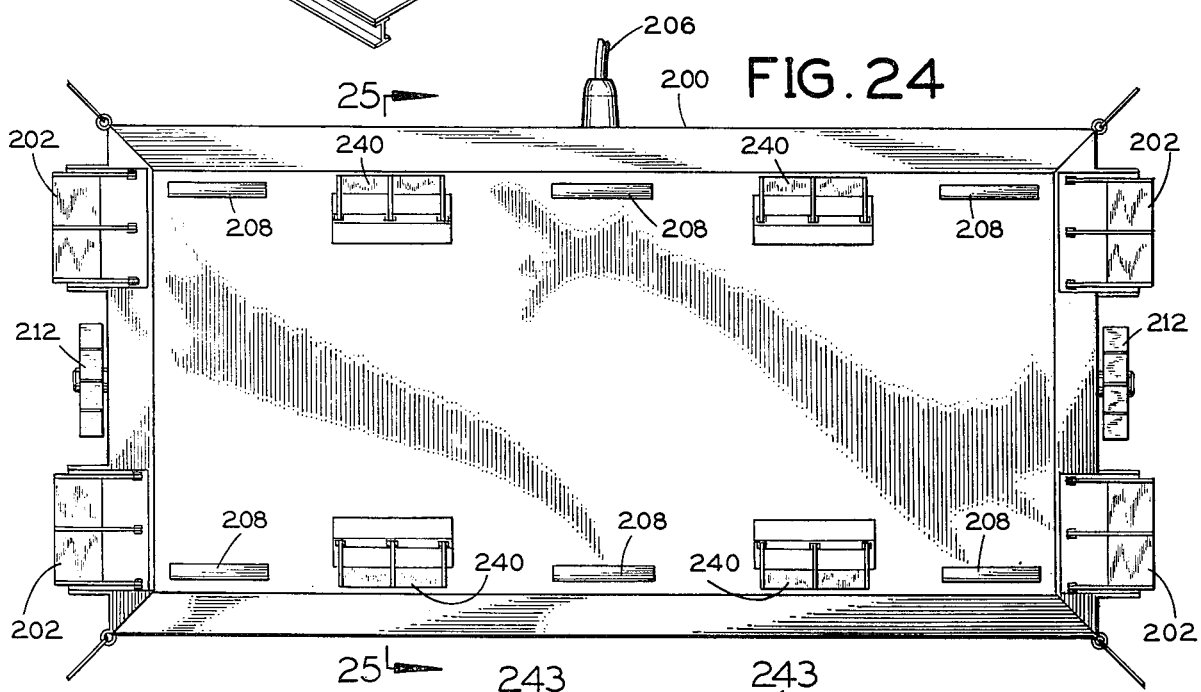
FIG. 24 is a bottom plan view of the water-borne vehicle.
Figure 25:
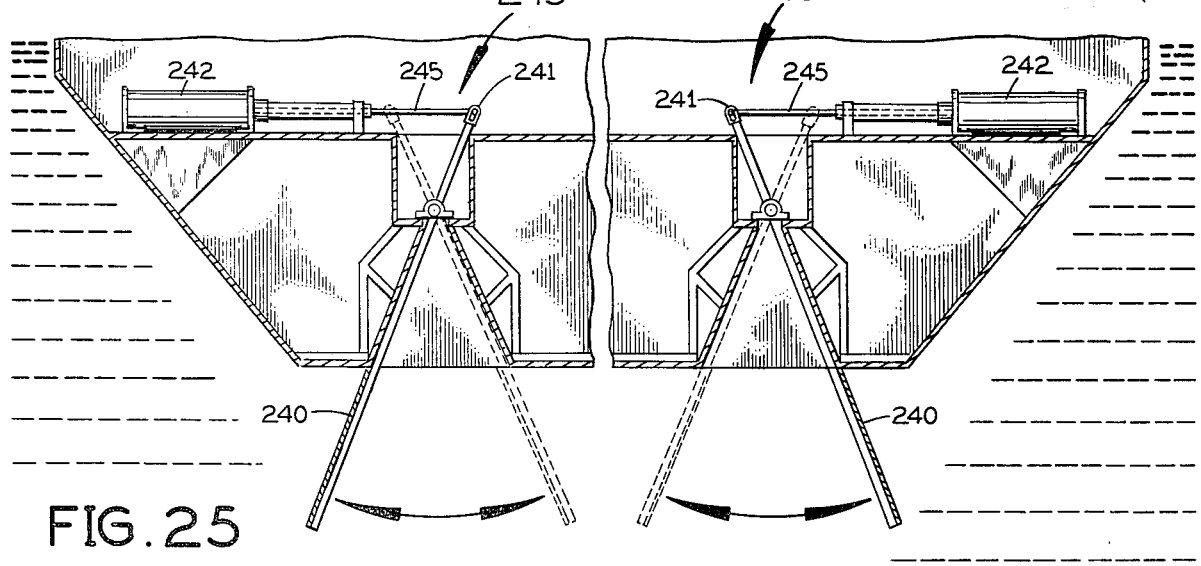
FIG. 25 is a sectional view taken along line 25—25 of FIG. 24.

FIG. 23 shows one of the paddles 240 which has couplings 241 for coupling the paddle to the piston rods 245 of the air compressor units 243 as shown in FIG. 25. The same construction can be used for paddles 202.

Having thus described my invention, I claim:

1. A vehicle-actuated air compressor comprising:

actuator means operatively arranged for actuation in response to motion of a vehicle;

a cylinder;

a piston having forward and reverse strokes in said cylinder and operatively coupled to said actuator means for movement in response to actuation of said actuator means by vehicle motion for compressing air in said cylinder;

first valve-controlled vent means for said cylinder communicating with one side of said piston for introducing air into said cylinder behind said piston during a forward stroke of said piston;

second valve-controlled vent means for said cylinder communicating with the other side of said piston for introducing air into said cylinder on the other side of said piston during a reverse stroke thereof;

first valve-controlled outlet means communicating with said other side of said piston for supplying air compressed by said piston during a forward stroke thereof to a utilization device;

and second valve-controlled outlet means communicating with said one side of said piston for supplying air compressed by said piston during a reverse stroke thereof to said utilization device;

said actuator means comprising:

a body with a first slot therein extending longitudinally of the direction of vehicle motion;

a lever slidable along said slot and projecting beyond said body for actuation by the vehicle to cause the lever to slide along said slot;

and a flexible cable operatively connected between said lever and said piston to cause movement of said piston in response to movement of said lever;

said slot having an offset at each end extending transverse to its length to permit movement of the lever out of the way of the vehicle as the latter moves past the air compressor.

2. A vehicle-actuated air compressor comprising: actuator means operatively arranged for actuation in response to motion of a vehicle;

a cylinder;

a piston having forward and reverse strokes in said cylinder and operatively coupled to said actuator means for movement in response to actuation of said actuator means by vehicle motion for compressing air in said cylinder;

first valve-controlled vent means for said cylinder communicating with one side of said piston for introducing air into said cylinder behind said piston during a forward stroke of said piston;

second valve-controlled vent means for said cylinder communicating with the other side of said piston for introducing air into said cylinder on the other side of said piston during a reverse stroke thereof;

first valve-controlled outlet means communicating with said other side of said piston for supplying air compressed by said piston during a forward stroke thereof to a utilization device;

and second valve-controlled outlet means communicating with said one side of said piston for supplying air compressed by said piston during a reverse stroke thereof to said utilization device;

said actuator means comprising:

a body with a horizontally elongated lower slot and a horizontally elongated upper slot therein spaced above said lower slot, said upper slot at each end thereof extending longitudinally beyond said lower slot and terminating in a downwardly off-set portion;

a lever carrying roller means on its lower end slidably received in said lower slot and an intermediate roller which is slidably received in said upper slot;

said lever projecting above said body and carrying a roller at its upper end above said body for engagement by the vehicle to cause said lower end roller means and said intermediate roller to slide respectively along said slots;

and a flexible cable operatively connected between said lever and said piston to impart a pull between the lever and the piston.

3. A vehicle-actuated air compressor according to claim 2, wherein said cable is operatively connected to said lever at its lower end.

4. A vehicle-actuated air compressor according to claim 3, wherein said roller means on the lower end of the lever comprises a pair of laterally spaced rollers slidable along said lower slot.

5. A vehicle-actuated air compressor according to claim 2, and further comprising:

a shaft rotatably supporting said roller means on the lower end of the lever;

and torsion spring means acting between said shaft and said lever and biasing said lever to a substantially vertical position extending up from said body.

6. A vehicle-actuated air compressor according to claim 4, wherein:

said roller means on the lower end of the lever comprises a pair of laterally spaced rollers slidably received in said lower slot;

and said cable is connected to said shaft between said laterally spaced rollers.

7. A vehicle-actuated air compressor assembly comprising a pair of air compressors according to claim 2, having the respective actuator means longitudinally aligned with each other and the respective cylinders longitudinally aligned with each other, and means rigidly interconnecting the pistons in the respective cylinders.

8. A vehicle-actuated air compressor assembly comprising a pair of air compressors according to claim 6, having the respective actuator means longitudinally aligned with each other and the respective cylinders longitudinally aligned with each other, and a piston rod rigidly interconnecting the pistons in the respective cylinders.

* * * * *